G. G. GREENE.
CASTER.
APPLICATION FILED MAY 8, 1914.

1,120,932.

Patented Dec. 15, 1914.

WITNESSES
M. Reimer
M. Hamilton

INVENTOR
Glenn G. Greene
BY
James Hamilton
ATTORNEY

UNITED STATES PATENT OFFICE.

GLENN G. GREENE, OF WARREN, PENNSYLVANIA.

CASTER.

1,120,932.   Specification of Letters Patent.   Patented Dec. 15, 1914.

Application filed May 8, 1914. Serial No. 837,114.

*To all whom it may concern:*

Be it known that I, GLENN G. GREENE, a citizen of the United States of America, residing at Warren, in the county of Warren and State of Pennsylvania, have invented certain new and useful Improvements in Casters, of which the following is a specification, reference being had to the accompanying drawings.

This invention relates to improvements in casters and particularly to improvements in casters of the pivot-bearing type; and an object of this invention is to provide a caster of this kind with bearing means arranged to engage the inner wall of the hollow leg of the bed, so that the caster will not be easily displaced from within the bedstead-leg, when the caster or leg strikes against an obstacle.

Figure 1:
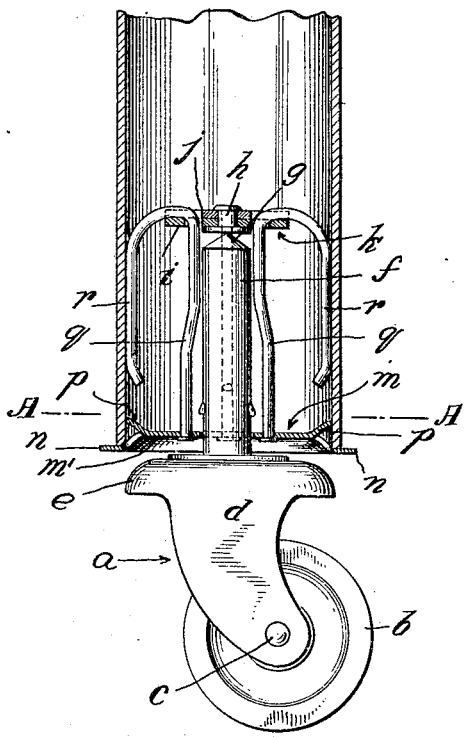
Figure 2:
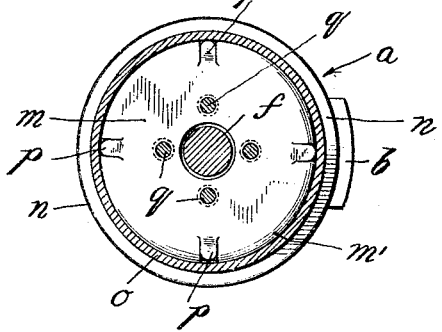

In the drawings illustrating the principle of this invention and the best mode now known to me of applying that principle, Figure 1 is an elevation, partly in section, of my new caster in place within a bedstead-leg; and Fig. 2 is a section on the line A—A of Fig. 1.

The caster $a$ is provided with a caster-wheel $b$ rotatably mounted upon the axle $c$ carried in the lower end of the cheeks or jaws $d$. From the yoke $e$ there rises the pintle $f$ the upper end $g$ of which is pointed to form a pivot. Upon this pivot rests the lower face of the centrally-disposed rivet or fastener $h$ which fastens together the plates $i$, $j$ of the disk $k$. The leg-supporting disk $m$ is dished upwardly at $m'$ and is formed with a flange $n$ which lies outside of the dished portion and upon which the lower end of the bedstead-leg $o$ rests. Struck up from the dished portion $m'$ of the disk $m$ are a series of lugs $p$ the free ends of which bear against the inner wall of the bedstead-leg, when the latter is supported in place upon the flange or ledge $n$. The disks $k$, $m$, are connected by a wire-frame comprising several U-shaped pieces of wire one leg $q$ of which connects the two disks $k$, $m$ and the other leg $r$ of which is free and bears resiliently and frictionally against the inner wall of the bedstead-leg. It is to be observed that the U-shaped spring-members do not cross from side to side of the vertical axis of the pintle, but, on the contrary, thereof, these U-shaped spring-members lie wholly on one or the other side of this vertical axis, as is clearly shown in Fig. 1.

By the provision of the lug $p$, there is obtained a bearing of the leg-supporting disk of the caster against the inner wall of the bedstead-leg; and this bearing prevents the accidental displacement of the caster, when either the latter or the bedstead-leg strikes an obstacle.

I claim:

A caster comprising a caster-wheel; a yoke having jaws which carry said caster-wheel; a pintle which rises from said yoke; a spring-frame the free ends of which bear frictionally against the inner wall of the bedstead-leg and hold the caster frictionally in place; and a leg-supporting plate which carries said spring-frame and is dished upwardly and from which are struck up lugs; said plate being adapted and arranged to support the bedstead-leg and said lugs being adapted and arranged to bear against the inner wall of said bedstead-leg and to resist displacement of the caster therefrom.

GLENN G. GREENE.

Witnesses:
JOSEPH A. SCHOFIELD,
HIRAM G. EDDY.

Copies of this patent may be obtained for five cents each, by addressing the "Commissioner of Patents, Washington, D. C."